United States Patent
He

(10) Patent No.: US 10,291,928 B2
(45) Date of Patent: May 14, 2019

(54) METHODS AND DEVICES FOR INTER-PREDICTION USING MOTION VECTORS FOR VIDEO CODING

(71) Applicant: BlackBerry Limited, Waterloo (CA)

(72) Inventor: Dake He, Waterloo (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 191 days.

(21) Appl. No.: 15/402,769

(22) Filed: Jan. 10, 2017

(65) Prior Publication Data

US 2018/0199052 A1   Jul. 12, 2018

(51) Int. Cl.
| | |
|---|---|
| *H04N 7/12* | (2006.01) |
| *H04N 11/02* | (2006.01) |
| *H04N 19/513* | (2014.01) |
| *H04N 19/176* | (2014.01) |
| *H04N 19/13* | (2014.01) |

(52) U.S. Cl.
CPC ......... *H04N 19/513* (2014.11); *H04N 19/13* (2014.11); *H04N 19/176* (2014.11)

(58) Field of Classification Search
CPC ..... H04N 19/13; H04N 19/176; H04N 19/513
See application file for complete search history.

(56) References Cited

U.S. PATENT DOCUMENTS

| | | | | |
|---|---|---|---|---|
| 5,717,470 A | * | 2/1998 | Jung ..................... | H04N 19/53 348/699 |
| 8,149,915 B1 | * | 4/2012 | Novotny ............... | H04N 19/53 375/240.16 |
| 8,340,188 B2 | | 12/2012 | Shi et al. | |
| 9,503,721 B2 | | 11/2016 | Lim et al. | |
| 9,313,494 B2 | | 12/2016 | Zheng et al. | |
| 2011/0188579 A1 | * | 8/2011 | Lin ........................ | H04N 19/56 375/240.16 |
| 2014/0355687 A1 | * | 12/2014 | Takehara ............. | H04N 19/105 375/240.16 |

(Continued)

OTHER PUBLICATIONS

W. Chien, P. Chen, X. Wang and M. Karczewicz, Adaptive resolution on motion vector difference, Torino, IT: JCTVC-F567, 2011.

(Continued)

*Primary Examiner* — Jessica M Prince
(74) *Attorney, Agent, or Firm* — Rowand LLP

(57) ABSTRACT

Methods and devices for video coding using inter-coding and removing redundant motion vectors from a set of candidate motion vectors. The methods may determine that at least some candidate motion vectors in a set of candidate motion vectors in a search range around the motion vector predictor identify candidate blocks in the previously-reconstructed reference picture that are redundant and, based on that determination, eliminate said at least some of the candidate motion vectors to reduce the set to a subset. In some cases, a candidate block is redundant if it is less than a threshold different from another of the candidate blocks identified by one of the candidate motion vectors in the set. A function may be applied to the candidate block and the another candidate block. If the output from the function in the two cases is the same, then the blocks are determined to be redundant.

26 Claims, 8 Drawing Sheets

(56) References Cited

U.S. PATENT DOCUMENTS

2016/0205409 A1* 7/2016 Park .................. H04N 19/176
                                                    375/240.12
2017/0163999 A1* 6/2017 Li .................... H04N 19/105

OTHER PUBLICATIONS

X. Ji, D. Zhao and W. Gao, "Block-wise adaptive motion accuracy based b-picture coding with low-complexity motion compensation," IEEE Trans. Circuits Syst. Video Technol., vol. 17, pp. 1085-1090, 2007.

J. Ma, A. J., K. Zhang, S. Ma and S. Lei, "Progressive motion vector resolution for HEVC," in Proc. VCIP, 2013.

L. Guo, P. Yin, Y. Zheng, X. Lu, Q. Xu and J. Sole., "Adaptive motion vector resolution with implicit signaling," in Proc. ICIP, Hong Kong, 2010.

R.-S. Lin, D. A. Ross and J. Yagnik, "SPEC Hashing: Similarity Preserving algorithm for Entropy-based Coding," in Proc. CVPR, 2010.

M. Bhaskaranand and J. D. Gibson, "Distributions of 3D DCT coefficients for video," in Proc. ICASSP, 2009.

International Search Report and Written Opinion, relating to application No. PCT/CA2018/050017, dated Apr. 3, 2018.

* cited by examiner

METHODS AND DEVICES FOR INTER-PREDICTION USING MOTION VECTORS FOR VIDEO CODING

FIELD

The present application generally relates to video coding and, in particular, methods and systems for improved coding of motion vectors in video coding.

BACKGROUND

Data compression is used in communications and computer networking to store, transmit, and reproduce information efficiently. It finds particular application in the encoding of images, audio and video. Common image compression formats include JPEG, TIFF, and PNG. A newly-developed video coding standard is the ITU-T H.265/HEVC standard. Other video coding formats include the VP8 and VP9 formats developed by Google Inc. Evolutions to all of these standards and formats are under active development.

All of these image and video coding standards and formats are based on predictive coding that create a prediction of data to be coded, then encode the error (often called the residual) in the prediction for transmission to a decoder as a bitstream. The decoder then makes the same prediction and adjusts it by the reconstructed error decoded from the bitstream. The data compression of the error at the encoder often includes a spectral transform of the error to create blocks of transform domain coefficients. This is typically accompanied by lossy quantization. The reverse operations are performed at the decoder to reconstruct the error/residual. Entropy coding (often context-adaptive) is typically used to encode the residual data, plus side information for making the predictions (e.g. intra-coding mode or inter-coding motion vectors), to generate a bitstream for transmission from encoder to decoder or for storage on a storage medium for later decoding. In some cases, the error at the encoder is encoded without using a spectral transform and/or quantization.

In the case of inter-coding, i.e. motion compensation, the prediction is based on a block or portion of pixel data from a previously-reconstructed picture earlier in the coding order (usually a picture earlier in the display sequence of the video, but not necessarily). The encoder losslessly encodes information specifying the motion vector for building a prediction block, and the decoder decodes that information in order to identify the same prediction block. In some cases, the encoder and decoder both generate a motion vector predictor and the encoder searches within a search set of nearby motion vectors to identify, often based on rate-distortion optimization, a selected motion vector. The encoder then encodes the difference between the selected motion vector and the motion vector predictor.

It has been found that motion vector coding can occupy a large portion of the overall bit rate for encoding. In some cases, motion vector coding may make up 30% to 50% of the total bit rate for inter-coded pictures. Accordingly, it may be advantageous to find a more efficient way to encode motion vectors.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
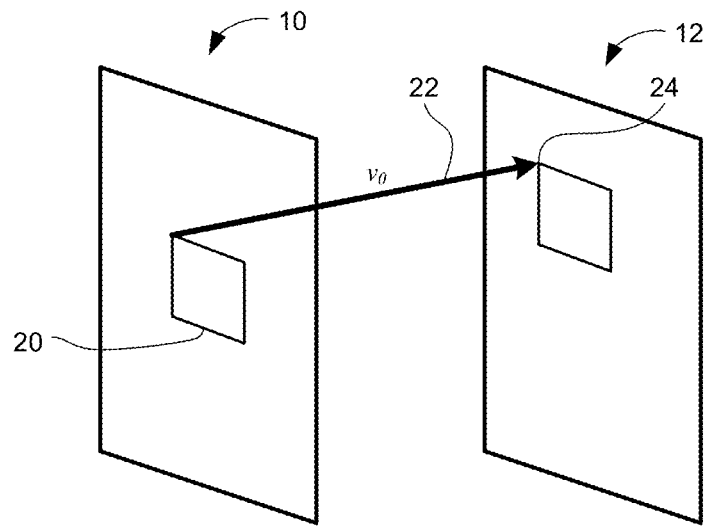
FIG. 1 diagrammatically illustrates an example of inter-prediction.

The present application describes methods of encoding and decoding video, and encoders and decoders for encoding and decoding video.

In a first aspect, the present application describes a method of encoding a video in a video encoder to produce a bitstream, the video including a sequence of pictures including a current picture and a previously-reconstructed reference picture, the current picture including a current block to be encoded using inter-prediction. The method includes determining, for the current block, a motion vector predictor that identifies a block in the previously-reconstructed reference picture; determining that at least some candidate motion vectors in a set of candidate motion vectors in a search range around the motion vector predictor identify respective candidate blocks in the previously-reconstructed reference picture that are redundant and, based on that determination, eliminating said at least some of the candidate motion vectors to reduce the set to a subset, and wherein said one of the candidate blocks is determined to be redundant based on applying a function to said one of the candidate blocks and to said another of the candidate blocks and determining that the result of said function is identical in both cases; selecting, from among the candidate motion vectors in the subset, a current motion vector to identify a predicted block for the current block; and entropy encoding the current motion vector selected from the subset.

In another aspect, the present application describes a method of decoding a video from a bitstream, the video including a sequence of pictures including a current picture and a previously-reconstructed reference picture, the current picture including a current block to be decoded using inter-prediction. The method includes determining, for the current block, a motion vector predictor that identifies a block in the previously-reconstructed reference picture; determining that at least some candidate motion vectors in a set of candidate motion vectors in a search range around the motion vector predictor identify respective candidate blocks in the previously-reconstructed reference picture that are redundant and, based on that determination, eliminating said at least some of the candidate motion vectors to reduce the set to a subset, and wherein said one of the candidate blocks is determined to be redundant based on applying a function to said one of the candidate blocks and to said another of the candidate blocks and determining that the result of said function is identical in both cases; entropy decoding a current motion vector from the bitstream on the basis that it is one of the candidate motion vectors from the subset, wherein the current motion vector identifies a predicted block for the current block; and reconstructing the current block based on the predicted block and a reconstructed residual for the current block.

In a further aspect, the present application describes encoders and decoders configured to implement such methods of encoding and decoding.

In yet a further aspect, the present application describes non-transitory computer-readable media storing computer-executable program instructions which, when executed, cause one or more processors to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264/AVC standard for video coding, the H.265/HEVC standard, the VP8 format, the VP9 format, or others. Those ordinarily skilled in the art will understand that the present application is not limited to those video coding standards and formats but may be applicable to other video coding/decoding standards and formats, including possible future standards, multi-view coding standards, scalable video coding standards, 3D video coding standards, and reconfigurable video coding standards. Similarly, to the extent that reference is made to particular image coding standards and formats, it will be appreciated that the processes and devices described may be implemented in connection with other standards, including future standards.

In the description that follows, when referring to video the terms frame, picture, slice, tile, quantization group, and rectangular slice group may be used somewhat interchangeably. Those of skill in the art will appreciate that a picture or frame may contain one or more slices or segments. A series of frames/pictures may be called a "sequence" in some cases. Other terms may be used in other video or image coding standards. It will also be appreciated that certain encoding/decoding operations might be performed on a frame-by-frame basis, some are performed on a slice-by-slice basis, some picture-by-picture, some tile-by-tile, and some by rectangular slice group, etc., depending on the particular requirements or terminology of the applicable image or video coding standard. In any particular embodiment, the applicable image or video coding standard may determine whether certain operations described below are performed in connection with frames and/or slices and/or pictures and/or tiles and/or rectangular slice groups, etc., as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment.

Likewise, examples below may refer to a "block", "current block", or "prediction block", in some cases. A "block" in this sense refers to a portion of a picture, such as a coding tree unit, coding unit, prediction unit, transform unit, quantization group, etc., as the case may be. Blocks may be square in many cases, but may be non-square in other cases.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Modern image and video coding processes almost all rely upon predictive coding to compress the image data. Block-based predictive coding involves partitioning a picture into a plurality of 2D blocks (often square or rectangular, and possibly of varying sizes) and encoding the data block-by-block. To compress the data, rather than encoding the raw pixel data, a prediction of the block is generated and the difference (termed the error or residual) between the original block and the predicted block is encoded. Encoding typically involves the 2D spectral transform of the residual data, the quantization of the transform coefficients, and the entropy encoding of the quantized transform coefficients in accordance with whatever entropy coding scheme, possibly including binarization, is being used for a given case.

The creation of a predicted block is often either created through inter prediction (e.g. relying upon pixel data in a previously-reconstructed picture in a sequence of pictures) or intra prediction (e.g. relying upon nearby previously-reconstructed pixel data in the same picture as the current block). As such, inter prediction aims at exploiting temporal redundancy between pictures, and intra prediction aims at exploiting spatial redundancy within a picture.

In conventional 2D video coding, an original block of pixels may be denoted by x and its prediction denoted by p. The prediction p is generated from previously-reconstructed image data using either intra or inter prediction. Since p is available to both the encoder and the decoder, one can subtract p from x to obtain the residual as follows:

$$e = x - p$$

The residual e is spectrally transformed, quantized and entropy encoded to create a bitstream of encoded video data. At the decoder, the encoded data is entropy decoded to recover the spectrally-transformed, quantized residual, which is then inverse quantized and inverse transformed to reconstruct the residual. The reconstructed block of pixel data is then obtained by adding the reconstructed residual to the predicted block.

To determine how to generate the predicted block, the decoder entropy decodes prediction information. In the case of intra coding, the prediction information may include an intra-coding mode (i.e. prediction direction). In the case of inter coding, the prediction information may include one or more motion vectors.

The encoder may select a motion vector by evaluating a set of candidate motion vectors. That is, a search set of possible motion vectors may be tested by the encoder and one of them selected based on some criteria, for example using a rate-distortion optimization evaluation.

In some cases, the encoder first determines a motion vector predictor for a current block. The motion vector predictor may be generated using a number of techniques, but often it is based on one or more previously-selected motion vectors, such as for neighboring or nearby blocks, and may involve some averaging or weighted averaging of those motion vectors. The motion vector predictor may then serve as an anchor point for determining the area within which to search for a selected motion vector. For example, the search range may be around the motion vector predictor. In some cases, the search range may be centered on the motion vector predictor. The motion vector may be denoted $\vec{v}=(v_x, v_y, v_t)$ where $v_x$ denotes the distance to x measured in parallel to the x-axis (horizontal), $v_y$ denotes the distance to x measured in parallel to the y-axis (vertical), and $v_t$ is the index of the reference picture from which the prediction of x is generated by using $(v_x, v_y)$ along the coordinates of x. Note that $v_t$ is sometimes referred to as the reference picture index. In some cases, $v_t$ denotes the distance of the given reference picture to x measured in parallel to the time axis. In some other cases, $v_t$ denotes the index of a picture in a buffer holding reference pictures. The motion vector predictor (termed "motion vector predictor" or MVP, in some cases), may be expressed as $\vec{v}_0=(v_{0,x}, v_{0,y}, v_{0,t})$.

FIG. 1 diagrammatically illustrates an example of inter-prediction. Two pictures from a video sequence are shown, denoted 10 and 12. Picture 10 is encoded and decoded after picture 12, so that the reconstructed data of picture 12 is available for prediction. Picture 12 may or may not be earlier than picture 10 in the display order, but it is earlier than picture 10 in the coding order.

When coding a block 20 in picture 10 and using picture 12 as a reference picture for building a predicted block for block 20, a motion vector predictor 22, $\vec{v}_0$, is generated. The motion vector predictor 22 may be based on previously-selected motion vectors for one or more blocks in picture 10 near block 20, in some cases. Howsoever it is generated, the motion vector predictor 22 points to a block in picture 12, the upper-left corner of which is indicated by reference numeral 24. This point 24 indicated by the motion vector predictor 22 helps define the search area within which the encoder looks for a locally-optimal motion vector for block 20.

It will be appreciated that a search range may include searching through multiple previously-reconstructed pictures, i.e. over a range of $v_t$, but for ease of illustration the discussion below is focused on the example of a 2D search area within one previously-reconstructed picture.

Figure 2:
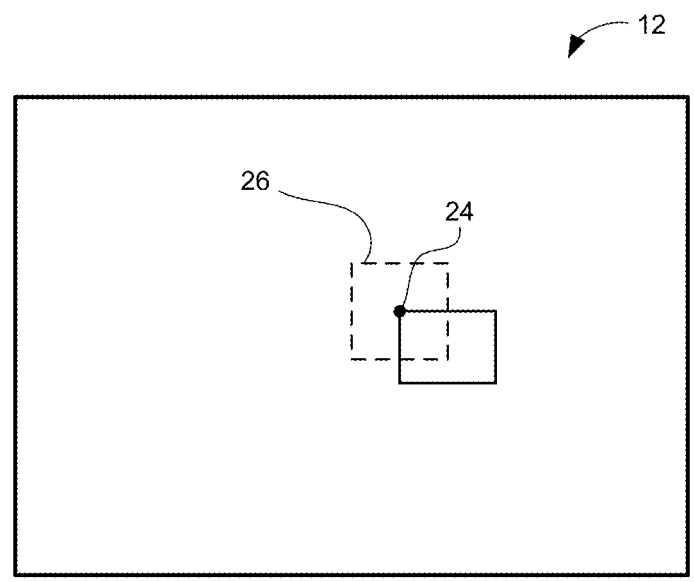
FIG. 2 diagrammatically shows the previously-reconstructed picture and a search range within the previously-reconstructed picture.

FIG. 2 diagrammatically shows the previously-reconstructed picture 12 and a search range 26 within the previously-reconstructed picture.

Many standards, such as HEVC, allow for motion vectors to be defined at sub-pixel resolution. That is, a motion vector may point to an integer pixel position, such that it identifies a block of previously-reconstructed pixels, or it may point to a sub-pixel position between integer pixels such that it identifies a block of sub-pixels that are built by interpolating the sub-pixel values at those in-between locations. The sub-pixels may be half-pel, quarter-pel, or other resolutions. The interpolation may be based on applying a filter to determine the sub-pixel values based on a weighted averaging of nearby integer pixel values.

Figure 3:
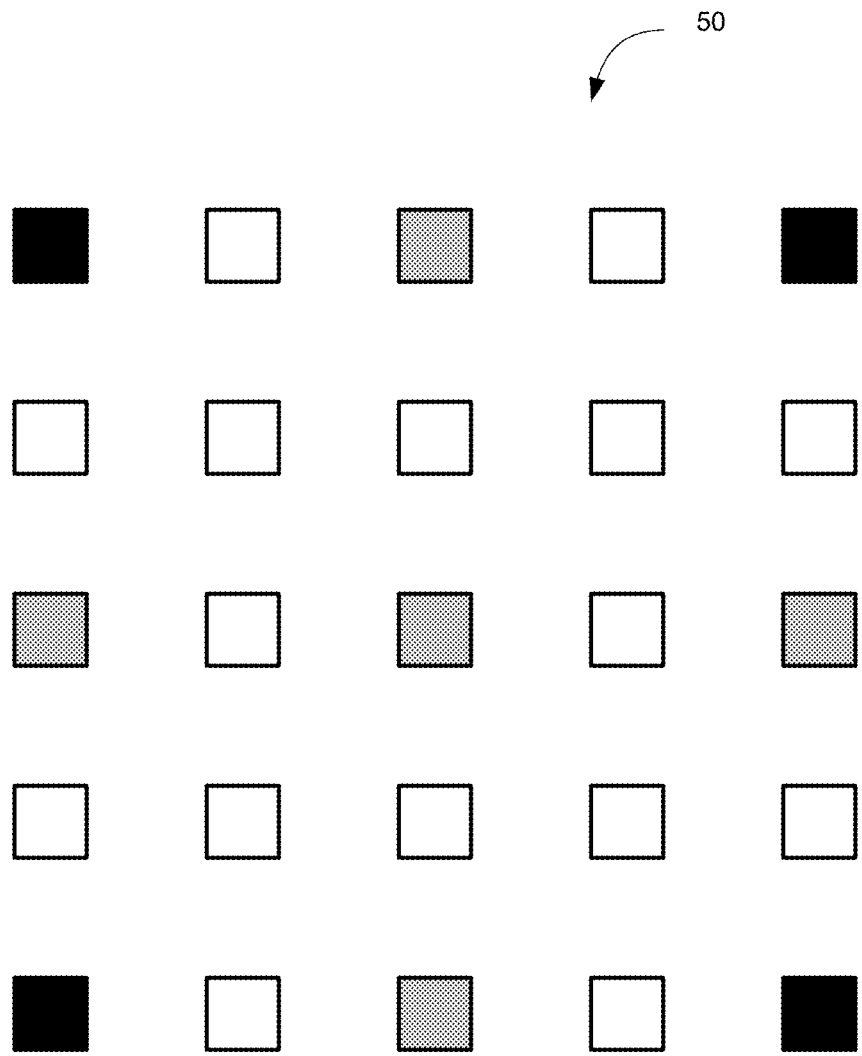
FIG. 3 shows an example grid of pixels.

FIG. 3 shows an example grid of pixels 50. The integer positions are indicated by black squares, the half-pel positions are indicated by grey squares, and the quarter-pel positions are indicated by white squares.

Determine a motion vector $\vec{v}_0=(v_{0,x}, v_{0,y}, v_{0,t})$ from a coded or reconstructed neighbourhood of x, e.g., the motion vectors obtained for blocks in a neighborhood of x, such that $v_{0,t}=v_t$. Here a coded or reconstructed neighbourhood of x consists of blocks that are coded or reconstructed prior to coding x, respectively. The vector $\vec{v}_0$ is sometimes referred to as a MVP in the literature of video coding.

1. Use $\vec{v}_0$ as the origin to define a search area $I_x$, e.g., $I_x=\{(i,j,v_t):|i-v_{0,x}|\leq K_x, |j-v_{0,y}|\leq K_y\}$, where $(K_x, K_y)$ are known both to the encoder and the decoder. Typical values of $K_x$ and $K_y$ are 32, 64, 128, 256, 512. Note that without losing generality, motion vectors here are defined on a quarter-pel grid. That is, $(K_x, K_y)=(128, 128)$ defines a search area of size 65×65 in pixels centered around $\vec{v}_0$. Also note that the subscript x here refers to the original block 20 (FIG. 1) for which the prediction is being generated.

2. Search in $I_x$ for $\vec{v}$ such that the distance between p at $\vec{v}$ and x is minimized 3. Entropy code the motion vector difference (MVD) $\vec{v}-\vec{v}_0$, i.e., $(v_x-v_{0,x}, v_y-v_{0,y}, 0)$.

As noted above, motion vectors are losslessly encoded using entropy encoding. The coding of motion vectors may in some cases, take up 30%-50% of total bit rate. If the bits required to code a motion vector can be reduced, at least on average, then the overall coding efficiency may be improved insofar as the encoded video occupies less memory when stored in a computer-readable medium and takes up less bandwidth for transmission. Thus changes described herein to the encoding and decoding processes may realize savings in bit rate that improve the efficient operation of video encoders and decoders, respectively, by achieving a greater degree of compression without increased distortion.

The present applicant has determined that there are often redundancies among the candidate blocks that are identified by the candidate motion vectors in a search area. That is, two or more of the candidate motion vectors in the search set may point to respective blocks in the previously-reconstructed reference picture that are effectively the same, i.e. are redundant. Redundant blocks are blocks that are identical or are so close that they are less than a threshold different from each other. In some cases, redundancy may be identified by applying a function $f(\ )$ to each of the blocks. If the resulting output of the function is the same for each block, then the two blocks are redundant. Example functions may include a hash function, quantization, or other simplifying functions.

Based on the fact that there are redundant blocks identified by the search set of possible candidate motion vectors, in one aspect, the present application proposes to reduce the search set by removing the motion vectors pointing to at least some of the redundant block, i.e. the redundant motion vectors, as candidates. In other words, the search set of candidate motion vectors is reduced to a search subset of candidate motion vectors by eliminating at least some of the redundant candidate motion vectors. A motion vector for a current block is then selected from the small search subset and is entropy encoded.

The fact that the motion vector has been selected from a smaller search subset means that it may be entropy encoded more efficiently than a motion vector selected from a larger set, in that the information sent to the decoder need only distinguish the selected motion vector from the smaller subset of remaining candidates and not from the larger original search set of candidate motion vectors. In this sense, the "alphabet" has changed/shrunk, and that change may be exploited in the entropy encoding/decoding to achieve bit savings.

The decoder performs the same redundancy analysis on the search set; that is, it identifies and eliminates at least some of the redundant candidate motion vectors to identify the subset. It then entropy decodes the encoded selected motion vector.

The selected motion vector may be directly encoded in some embodiments, e.g. by an index specifying it within the subset, or using differential from a motion vector predictor, e.g. 1D distance from the motion vector predictor in a predefined scan order within the search space wherein the indexing accounts for eliminated candidate motion vectors. In either case, the fact that the number of candidate motion vectors available for selection has been reduced can be exploited to encode the selected candidate more efficiently on average than would otherwise be the case.

Figure 4:
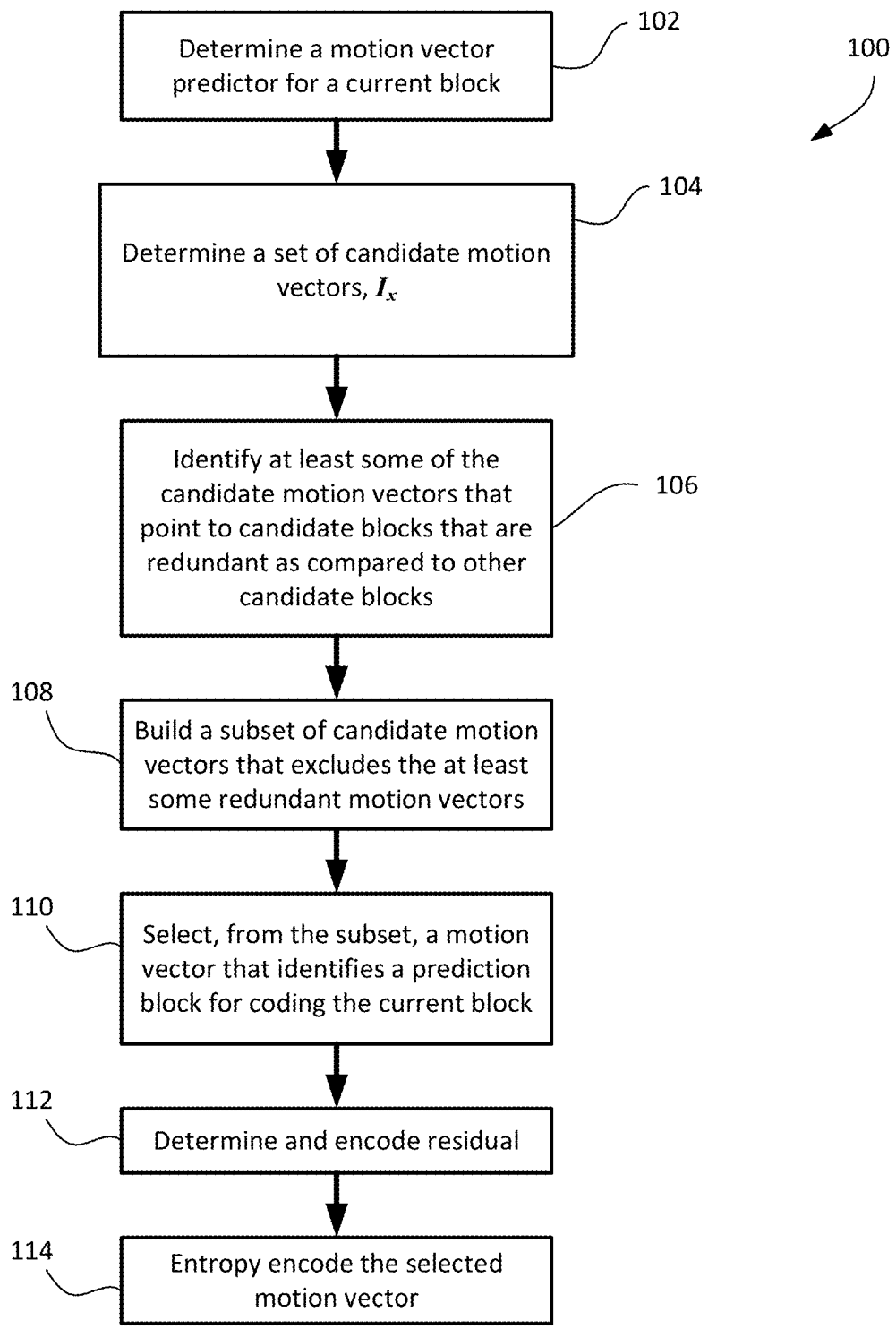
FIG. 4 shows an example method for encoding a motion vector in accordance with an embodiment of the present application.

Reference is now made to FIG. 4, which shows an example method 100 for encoding a motion vector in accordance with an embodiment of the present application. In operation 102, the encoder determines a motion vector predictor for a current block. As noted above, any one of a number of techniques may be used to generate the motion vector predictor. The motion vector predictor points to a location in a reference picture.

The encoder is configured to evaluate candidate motion vectors in a search range, as indicated by operation 104. That is, the search area or range within which the encoder searches includes a set $I_x$ of candidate motion vectors for the current block x. But in operation 106, the encoder identifies that at least some of the candidate motion vectors point to candidate blocks in the reference picture that are redundant as compared to other candidate blocks pointed to by other candidate motion vectors in the set. A candidate motion vector that point to a redundant block may be referred to as a redundant candidate motion vector. Accordingly, in operation 108, the encoder builds or generates a subset containing candidate motion vectors that excludes at least some of the redundant candidate motion vectors.

The encoder selects a motion vector for predicting the current block from the subset of candidate motion vectors in operation 110. Based on that prediction and the current block, the encoder determines the residual and encodes it in accordance with the applicable coding scheme, as indicated by operation 112. In many cases, this may include spectrally transforming the residual, quantizing it, and entropy encoding the quantized transform coefficients.

In operation 114, the encoder entropy encodes the selected motion vector. The encoding of the selected motion vector is based upon the alphabet that results from the building of the subset. That is, the encoding exploits the reduced size of the subset as compared to the original search set so as to try to encode the motion vector more efficiently. In this sense, the entropy encoding is changed or adapted based on the subset that results from reducing the set of candidate motion vectors. In other words, the elimination of redundant motion vectors changes the probability of those motion vectors to 0, which alters the probabilities associated with other motion vectors, thereby changing the entropy encoding.

Figure 5:
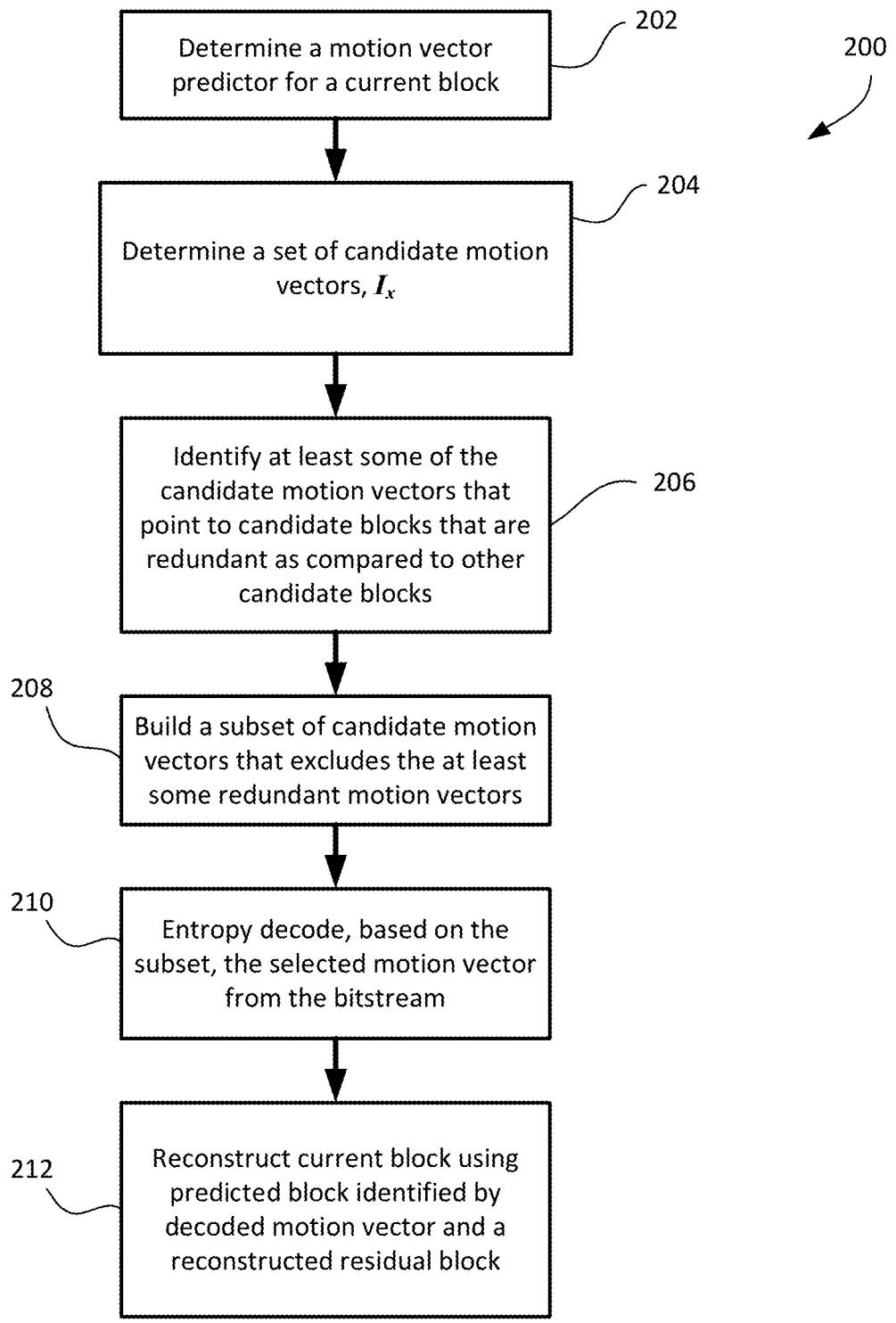
FIG. 5 shows one example method of decoding video and, in particular, a motion vector for an inter-coded video picture in accordance with an embodiment of the present application.

Reference is now made to FIG. 5, which shows one example of a method 200 of decoding a video and, in particular, decoding a motion vector for an inter-coded video picture. In operation 202, to reconstruct a current block in a current picture, the decoder determines a motion vector predictor. The decoder uses the same process used at the encoder so as to end up with the same motion vector predictor.

In operation 204, the decoder then determines the set of candidate motion vectors that would have been identified by the encoder based on the motion vector predictor, and in operation 206 the decoder uses the same process used by the encoder to identify at least some of the candidate motion vectors as redundant motion vectors. It then builds the same subset in operation 208 as was generated by the encoder. It will be appreciated that the decoder does not actually conduct a search for an optimal motion vector within the subset, but it needs the subset in order to decode the selected motion vector from the bitstream since the entropy encoding of that motion vector is based on the subset. Accordingly, in operation 210 the decoder entropy decodes the selected motion vector from the bitstream. The decoder then reconstructs the current block in operation 212 by finding the predicted block specified by the decoded motion vector and adding it to a reconstructed residual.

In the example methods described herein, both the encoder and decoder assess whether motion vectors are "redundant", which may not be limited to cases in which the prediction blocks identified by two vectors are identical. Taking into account quantization, $\vec{v}$ might become redundant even if $\vec{v}'$ generates a different prediction p' as long as p and p' are sufficiently close. In order to determine whether p and p' are sufficiently close and consequently whether $\vec{v}$ is redundant, various methods might be used. In one example, the rate and the distortion as a result of coding x–p and those of coding x–p' with a given quantization parameter Qp may be measured. If coding x–p results in the same rate and the same distortion as coding x–p' does, then $\vec{v}$ is considered redundant. In another embodiment, using a more relaxed condition, $\vec{v}$ is considered redundant if the rate-distortion performance resulting from coding x–p is within a prescribed threshold of that resulting from coding x–p'. However, since x is not available to the decoder, some approximations of the conditions on the rate-distortion performance described above may be used to make sure that both the encoder and the decoder can use the same condition to check if $\vec{v}$ is redundant.

In one example, $\vec{v}$ is considered redundant if the distance between p and p' is within a prescribed threshold, where the threshold might depend upon the quantization parameter Qp. In cases where an increase of Qp implies that a larger distortion is allowed, the distance threshold used to determine whether $\vec{v}$ is redundant might increase as Qp increases, reflecting the fact that as Qp increases, it is more likely that x–p and x–p' are similar after quantization. Common distance metrics including, but not limited to, $L_1$, $L_2$, $L_\infty$, MAE (mean absolute error), MSE (mean squared error), or SSIM (structural similarity) may be used.

In yet another example, a one-to-one or a many-to-one mapping function $f$ may be used. The motion vector $\vec{v}$ is considered redundant if $f(p)=f(p')$, in other words, the images of p and p' under $f$ are not different. Examples of such mappings include, but not limited to, locality-sensitive hashing, scalar or vector quantization, and dimensionality reduction methods like principle component analysis, autoencoder neural network, etc.

Without losing generality, some of the examples described herein may use a many-to-one mapping function $f$ to determine or identify redundant motion vectors.

Example encoders implementing the above-described process may include a modified motion vector analyzer to identify redundant motion vectors during the motion vector search, and the entropy encoder portion of the example encoder may be modified to make use of the subset in determining how to encode the motion vector (or motion vector difference, in many examples). Example decoders implementing the above-described process may include a motion vector analyzer to determine the set, identify redundant motion vectors, and build the subset. The entropy decoder portion of the example decoder may be modified to make use of the subset in determining how to decode the motion vector (or motion vector difference, in many examples).

Figure 6:
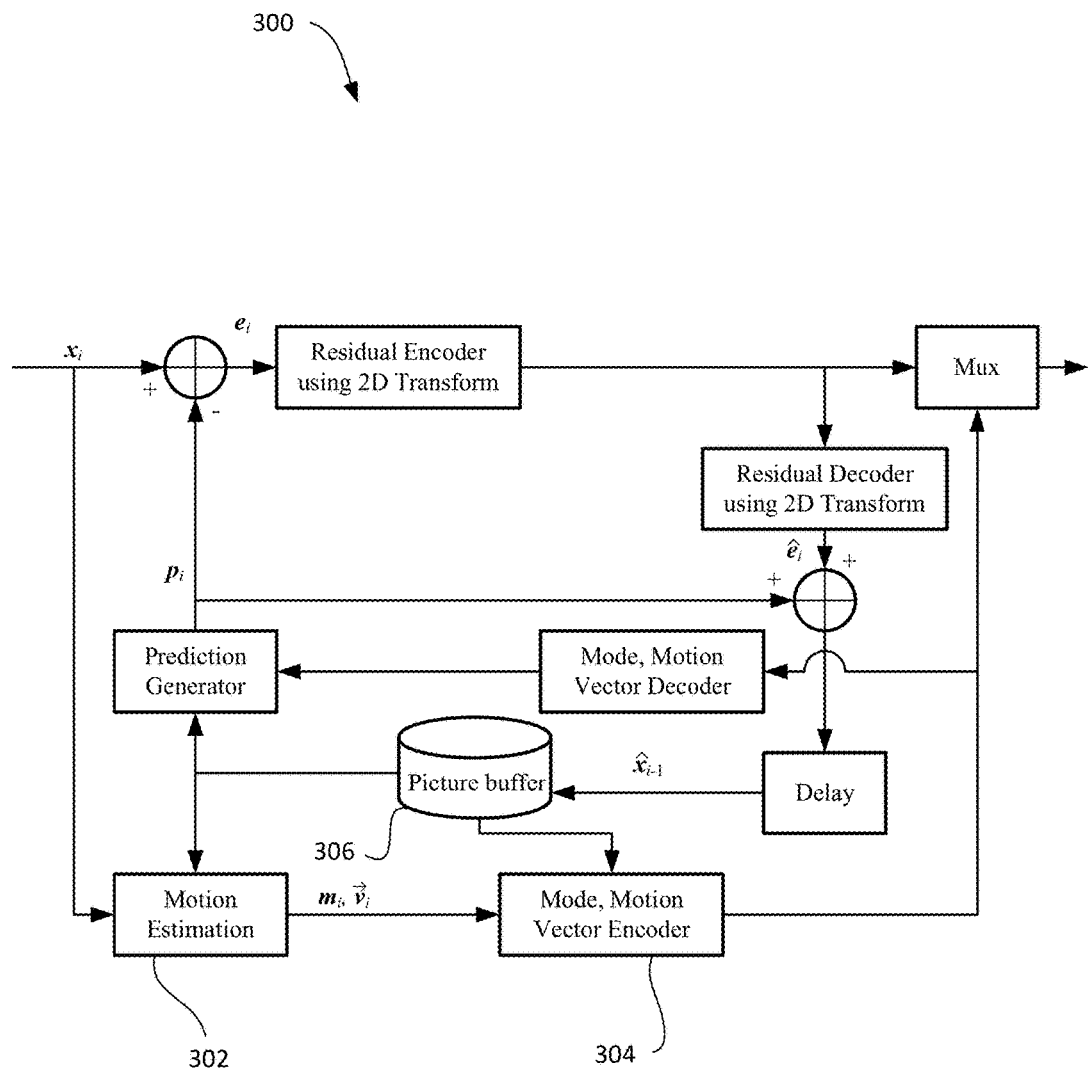
FIG. 6 shows a block diagram of one example of a video encoder.

Reference is now made to FIG. 6, which shows, in block diagram form, one example of a video encoder 300 in accordance with this aspect of the present application. In this example, the video encoder 300 includes the usual prediction feedback loop and a picture buffer 306 storing previously-reconstructed pictures that have been encoded and then decoded in the feedback loop. For a current picture, the motion estimation 302 function is carried out to find a selected motion vector for a block of the current picture. Once that motion vector is found, the selected motion vector $\vec{v}_i$ and mode $m_i$ are entropy encoded by mode, motion vector entropy encoder 304. In this example, a motion vector analyzer is within the motion estimation 302 function, where previously-reconstructed picture(s) may be analyzed to evaluate candidate motion vectors in the search range to identify and eliminate redundant ones, resulting in a subset of candidate motion vectors. That subset of candidate motion vectors is further used by the mode, motion vector encoder 304 to modify the entropy encoding of the selected motion vector so as to more efficiently encode the selected motion vector.

Figure 7:
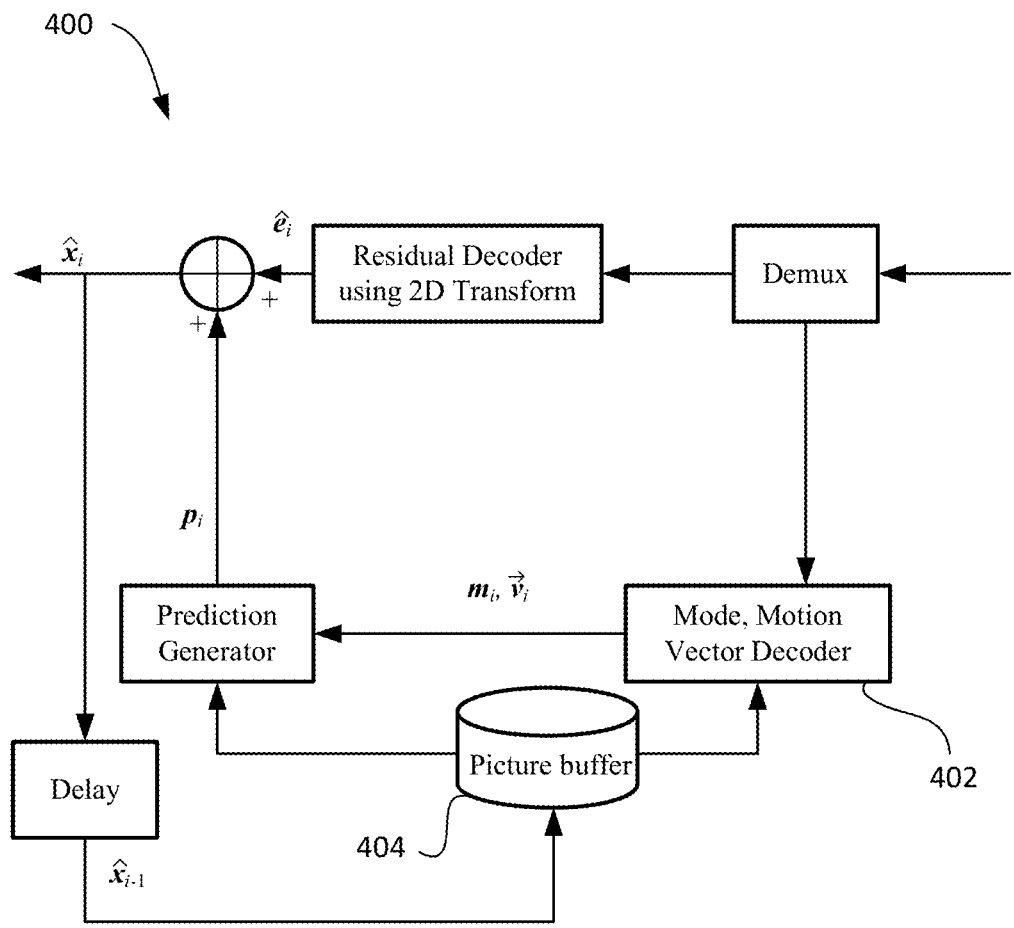
FIG. 7 shows a block diagram of one example of a video decoder.

Reference is now also made to FIG. 7, which shows, in block diagram form, an example video decoder 400 in accordance with an aspect of the present application. The video decoder 400 includes a mode, motion vector decoder 402 to entropy decode the mode and motion vector information for a block of a current picture that it is reconstructing. In this regard, it has a picture buffer 404 storing previously-reconstructed pictures from the video that may serve as reference pictures for an inter-coded block. In this case, however, the mode, motion vector decoder 402 further includes the motion vector analyzer for taking previously-reconstructed picture data and performing the same analysis of candidate motion vectors in a set to identify and remove redundant motion vectors, thereby reducing the set to a subset. The subset is then used to entropy decode the selected motion vector since the subset defines the alphabet that defines the entropy coding used.

Full Search

In one example implementation, the evaluation of the set to identify redundant motion vectors may involve a full search of the set. For example, using a preset scan order within the set, motion vectors are added to the subset unless the motion vector is redundant vis-à-vis a motion vector already in the subset.

In this example embodiment, let x denote a source block to be encoded or reconstructed, and let $I_x$ denote the set of candidate motion vectors for x.

1. If $I_x$ not already ordered, convert $I_x$ into an ordered set $\{\vec{v}_0, \ldots \vec{v}_1, \ldots \vec{v}_{K-1}\}$, where K denotes the number of vectors in $I_x$, and is a function of $(K_x, K_y)$ that defines the search area. Note such conversion might be implicit by defining a scanning method to traverse elements in $I_x$.

2. Initialize $I_x^{(0)} = \{\vec{v}_0\}$. Let j denote a counter and initialize j=1.

3. Determine the prediction block $p_j$ generated by motion vector $\vec{v}_j$.

4. Search in $I_x^{(j-1)}$ for a motion vector $\vec{v}$ with prediction p such that $f(p)=f(p)$. If no such a vector exists in $I_x^{(j-1)}$, set $I_x^{(j)} = I_x^{(j-1)} \cup \{\vec{v}_j\}$, i.e., $I_x^{(j)}$ is obtained by inserting $\vec{v}_j$ into $I_x^{(j-1)}$; otherwise set $I_x^{(j)} = I_x^{(j-1)}$ since $\vec{v}_j$ is determined to be redundant.

5. Increment j by 1.

6. Repeat Steps 3 to 5 until j=K−1.

At the end of the above process, the analyser outputs $I_x' = I_x^{(K-1)}$ as the set of candidate motion vectors for use in motion vector coding for x. $I_x'$ is a subset of $I_x$ and does not contain any redundant motion vectors.

In some embodiments, the above process may terminate under different conditions. For example, instead of terminating when j=K−1 in Step 6, the above process may terminate when the cardinality of $I_x^{(j-1)}$ or the number of vectors in $I_x^{(j-1)}$ is greater than a threshold. In yet another example, the above process may terminate when j is greater than a threshold that is less than K−1.

Layered Motion Vector Redundancy Analysis

In another aspect, the evaluation of the candidate motion vectors in the set may not be a full evaluation of each motion vector against all other motion vectors in the set. For example, the analysis may only test some of the motion vectors against members of the subset to see if they are redundant.

In this regard, the motion vector analyser may make use of the concept of "layers" to categorize the candidate motion vectors. Motion vectors at one layer may automatically be included in the subset and then motion vectors at another layer may be evaluated for redundancy against the motion vectors of the first layer. In one example, the proposed analyser checks the redundancy of a motion vector at layer i only against motion vectors at certain layers in a given set. By limiting the range of the analysis the computational burden may be reduced without significantly impacting the improvement in eliminating redundancy within the subset.

In some example embodiments, the layers are based on motion vector resolution. Without limiting the generality of such an implementation, the motion vectors that point to integer pixel positions may be members of a first layer, the motion vectors that point to half-pel pixel positions may be members of a second layer, and the motion vectors that point to quarter-pel pixel positions may be members of a third layer. In other implementations, a layer may be made up of motion vectors at 2× integer positions, or 4× integer positions, etc. Yet other criteria may be used to group motion vectors from the set into non-overlapping layers or sub-groups for the purpose of redundancy analysis.

In a first example, Layer 0 includes motion vectors pointing to integer-pel positions; layer 1 includes motion vectors pointing to half-pel positions; layer 2 includes motion vectors pointing to quarter-pel positions; and layer l includes motion vectors pointing to $\frac{1}{2}^{l+1}$-pel positions, where l is a positive integer.

In a second example, Layer 0 includes motion vectors pointing to positions (x, y) where x is a multiple of 8 and y is a multiple of 4; layer 1 includes the remaining motion vectors pointing to positions (x, y) where x is a multiple of 4 and y is a multiple of 2; layer 2 includes the remaining motion vectors pointing to positions (x, y) where x is a multiple of 2 and y is a multiple of 1; and layer 3 includes the remaining motion vectors. Note that here (x, y) might be an integer position if both x and y are multiples of 4, 8, or 1 depending upon whether quarter-pel, ⅛-pel, or $½^{i+1}$-pel interpolation is used.

In a third example, let $t_0, t_1, \ldots$, denote a sequence of non-negative integers such that $t_0 < t_1 < t_2 < \ldots$. Then layer 0 includes motion vectors pointing to positions (x, y) such that the distance between (x, y) and a known position $(x_0, y_0)$ is within $t_0$; layer 1 includes motion vectors pointing to positions (x, y) such that the distance between (x, y) and $(x_0, y_0)$ is greater than $t_0$ but less than or equal to $t_1$; and layer i, for any i>0, includes motion vectors pointing to positions (x, y) such that the distance between (x, y) and $(x_0, y_0)$ is greater than but less than or equal to $t_1$.

In one embodiment, the proposed analyser processes all motion vectors at one layer before processing motion vectors at the next layer.

In another embodiment, the proposed analyser processes motion vectors in a prescribed traversing order. Suppose that the current motion vector to be analysed is at layer i. Then motion vectors at layers $L_i \leq j \leq H_i$ in a neighbourhood are used to determine whether the current motion vector is redundant, where $L_i$ and $H_i$ are non-negative integers, possibly depending upon i. Example values of $(L_i, H_i)$ include (0, i), (0, i−1), (i−k, i), (i, i+k), and (i+1, i+k), where k is a known positive integer. Among these example values, (0, i−1) and (i+1, i+k) are amenable to parallel processing.

As an illustrative embodiment, consider a classification in which motion vectors are grouped into three layers: layers 0-2 include motion vectors pointing to integer-pel, half-pel, and quarter-pel positions, respectively. Let x denote a source block to be encoded or reconstructed, and let $I_x$ denote the set of candidate motion vectors for x. In this example, the motion vector analyser may carry out the analysis as follows:

A. If $I_x$ not already ordered, convert $I_x$ into an ordered set $\{\vec{v}_0, \ldots \vec{v}_1, \ldots \vec{v}_{K-1}\}$, where K denotes the number of vectors in $I_x$. Note such conversion might be implicit by defining a scanning method to traverse elements in $I_x$.

B. Initialize $I_x^{(0)} = \{\vec{v}_0\}$. Let j denote a counter and initialize j=1.

C. If $\vec{v}_j$ is at layer 0, set $I_x^{(j)} = I_x^{(j-1)} \cup \{\vec{v}_j\}$ and continue to Step D; otherwise, do the following:
  i. Determine the prediction block $p_j$ generated by motion vector $\vec{v}_j$.
  ii. Search in $I_x^{(j-1)}$ for a motion vector v with prediction p such that $f(p) = f(p_j)$. If no such a vector exists in $I_x^{(j-1)}$, set $I_x^{(j)} = I_x^{(j-1)} \cup \{\vec{v}_j\}$, i.e., $I_x^{(j)}$ is obtained by inserting $\vec{v}_j$ into $I_x^{(j-1)}$; otherwise set $I_x^{(j)} = I_x^{(j-1)}$ since $\vec{v}_j$ is determined to be redundant.

D. Increment j by 1.

E. Repeat Steps C-D until j=K−1.

At the end of the above process, the analyser outputs $I_x' = I_x^{(K-1)}$ as the set of candidate motion vectors for use in motion vector coding for x.

In one implementation of operation A above, the scanning method can be selected to visit all integer-pel positions first, then all half-pel positions, and finally all quarter-pel positions. By using such a scanning method, the analyser effectively processes one layer at a time; that is, all motion vectors at layer i are analysed before any motion vectors at layer i'>i.

In operation C above, in order to control computational complexity, the search may be limited to motion vectors at lower layers and in the immediate neighbourhood. For example, for a motion vector pointing to a half-pel position, the analyser may check only the motion vectors pointing to the integer-pel positions in the immediate neighbourhood; and for a motion vector pointing to the quarter-pel position, the analyser may check the motion vectors pointing to the integer-pel positions and the half-pel positions in the immediate neighbourhood. The immediate neighbourhood may be defined as less than the distance between integer pixels, less than the distance between half-pel pixels, twice the distance between integer pixels, or using a predefined template that selects a predetermined number and pattern of surrounding pixels for example.

In some embodiments, the above process may terminate under different conditions. For example, instead of terminating when j=K−1 in Step E, the above process may terminate when the cardinality of $I_x^{(j-1)}$ or the number of vectors in $I_x^{(j-1)}$ is greater than a threshold. In yet another example, the above process may terminate when j is greater than a threshold that is less than K−1.

Adaptive Motion Vector Resolution

It will be appreciated that the above-described analysis of motion vector redundancy provides insight into the degree to which motion vector resolution is wasted on specifying redundant prediction blocks. Accordingly, in another aspect, the present application proposes that the encoder and decoder could implement adaptive motion vector resolution determination based on redundancy analysis. Advantageously, this avoids having to signal changes in motion vector resolution since the same analysis of the set of candidate motion vectors may be carried out by the decoder to determine the resolution used by the encoder to signal selected motion vectors.

As an example, suppose that a size N×N prediction block is to be generated from a given interpolated reference picture. The blocks available at half-pel and quarter-pel resolution may be analysed to assess how many of them would be redundant. If more than a threshold number are redundant, then the resolution may be adjusted to eliminate, for example, quarter-pel motion vectors or even half-pel motion vectors. For example, at each half-pel or quarter-pel position (h, v), check if the N×N block at that position, i.e., the block including pixels at positions (x, y) where x∈ {h+4, . . . , h+(N−1)*4} and y∈{v, v+4, . . . , v+(N−1)*4}, is redundant. If the block is redundant, mark that the position (h, v) is not available for block size N×N; otherwise mark that the position (h, v) is available for block size N×N in this reference picture. When a motion vector is to be coded or decoded to generate a size N×N prediction block, then only those motion vectors pointing to positions marked available for block size N×N are candidates. It will be appreciated that the analysis of the N×N blocks may be carried out once for an entire reconstructed picture in some embodiments, since that reconstructed picture may be used as a reference picture multiple times. In some embodiments, the analysis may be carried out when the picture is first to be used as a reference picture. The analysis may be carried out for a region that is less than the full picture in some cases.

In an example embodiment, for a region in the given reference picture, if the number of quarter-pel positions marked available for block size N×N is less than a first prescribed threshold, all quarter-pel positions in the region are marked as not available for block size N×N. If the number of quarter-pel positions marked available for block size N×N is less than a first prescribed threshold and if the number of half-pel positions marked available for block size N×N is less than a second prescribed threshold, all half-pel positions in the region are marked as not available for block size N×N.

In yet another embodiment, instead of using the same resolution, say quarter-pa, in both the horizontal and vertical directions, the analyser may use one resolution horizontally and a different resolution vertically, i.e., two different resolutions for the x and y coordinates. For example, for block size N×N, the horizontal resolution may be quarter-pel and the vertical resolution may be half-pel, i.e., a position (h, v) is available only if (0, v) is either a half-pel or integer-pel position on the y-axis. As an example, the horizontal resolution may be determined as follows:

For a region in the given reference picture, if the number of quarter-pel positions (h, v) marked available for block size N×N such that (h, 0) is a quarter-pel position is less than a first prescribed threshold, mark all quarter-pel positions (h, v) in the region such that (h, 0) is a quarter-pel position as not available for block size N×N, i.e., the horizontal resolution is at most half-pel. If the number of quarter-pel positions (h, v) marked available for block size N×N such that (h, 0) is a quarter-pel position is less than a first prescribed threshold and if the number of half-pel positions (h, v) marked available for block size N×N such that (h, 0) is a half-pel position is less than a second prescribed threshold, mark all half-pel positions (h, v) such that (h, 0) is a half-pel position in the region as not available for block size N×N, i.e., the horizontal resolution is at most integer-pel.

The vertical resolution may be determined by using a method similar to the one described above. Note that thresholds used to determine the vertical resolution may be different from those used to determine the horizontal resolution.

The above examples presume that the maximum resolution is quarter-pel, but other embodiments may feature a different maximum resolution. In addition, the examples presume that the minimum resolution is integer-pel, but other embodiments may feature a different minimum resolution.

Control Parameters

In some applications, like mobile video, the computational complexity incurred by redundancy analysis of motion vectors may be a concern. To address such concerns, in some embodiments flags and/or parameters may be used that are intended to signal to a decoder what level of complexity of motion vector analysis is used for a given video, picture, or portion thereof.

For example, one flag may be inserted in the sequence, the picture, the slice, or the coding unit parameter set to indicate whether the motion vector analyser is to be enabled or disabled for the sequence, the picture, or the slice, etc., respectively.

In another example, when the full motion vector analyser search is enabled and used, parameters may be inserted in the sequence, the picture, the slice, or the (largest) coding unit parameter set to specify search parameters. Examples of such parameters include the number of motion vectors in $I_x^{(j-1)}$ to be checked against, the selection of function $f$, and/or parameters, e.g. distance thresholds, that are used to determine whether a motion vector is redundant.

Similarly, if the motion vector analyser uses a layered motion vector analysis, then parameters may be inserted in the sequence, the picture, the slice, or the (largest) coding unit parameter set to control the search with respect to the current sequence, picture, slice, or (largest) coding unit, respectively. Examples of such parameters include the layers for which redundancy analysis is to be performed or can be skipped at the decoder, the layers in $I_x^{(j-1)}$ that are to be checked in the search, number of motion vectors at those layers to be checked against, the search region, and the selection of function $f$. For example, for each layer a binary flag may be inserted into the slice header as part of the slice parameter set to indicate to the decoder whether motion vectors at the corresponding layer are to be analysed for redundancy (the flag is set) or not (the flag is clear). Note that the encoder may carry out the analysis and then determine whether the binary flag should be set or cleared for a particular layer for the benefit of the decoder.

Furthermore, if adaptive motion vector resolution is enabled and used, parameters may be inserted in the sequence, the picture, the slice, or the (largest) coding unit parameter set to configure adaptive motion vector resolution for the current sequence, picture, slice, or (largest) coding unit, respectively. Examples of such parameters include the minimum motion vector resolution, the maximum motion vector resolution, and the selection of function $f$.

Additional Embodiments

We may refer to two candidate motion vectors as "redundant siblings" if the predicted blocks generated by those two sibling motion vectors are less than a threshold different; that is, they satisfy the equality: $f(p')=f(p)$. Note that by extension, a candidate motion vector may have more than one redundant sibling. In one embodiment, the probability used to code a motion vector may be adjusted based on how many redundant siblings the motion vector has. For example, the probability used to code a current motion vector may be adjusted higher if the current motion vector has more redundant siblings. In another example, one probability may be used to code a current motion vector if it does not have a redundant sibling; and another probability may be used if the current motion vector has at least one redundant sibling. In both examples above, the probability before adjustment may be learned from the coded history, e.g. in the current slice.

In another example embodiment, instead of removing redundant motion vectors some additional processing steps may be used to make these motion vectors no longer redundant. For example, at each position that a motion vector points to, a rule to generate multiple, distinct versions of prediction blocks may be defined. Once a motion vector is found to be redundant with the first version of the prediction block, then a search may be performed to find an alternate version of the prediction block generated according to the defined rule, that makes the motion vector not redundant. To make sure that the encoder and the decoder find the same version of the prediction block, the rule may ensure that alternatives are generated in a way that is known both to the encoder and the decoder in a specific, unambiguous order, or the encoder and the decoder follow a same, predetermined protocol in performing the search. As an example of generation multiple, distinct version of prediction blocks at a position that a motion vector points to, the analyser may use different filters, e.g. filters with different coefficients or even different types of filters (linear, nonlinear, IIR, FIR), to interpolate fraction-pel samples, or to filter integer-pel samples.

In yet another example embodiment, instead of encoding and decoding motion vectors by using entropy coding, the entropy encoder and the entropy decoder may be replaced by a general encoder and a general decoder if some loss of information in motion vector information is allowed for bit savings. For example, some least significant bits of a motion vector may be discarded at the general encoder, and may be reconstructed by the general decoder to some estimated values.

It will further be appreciated that the concept and the definition of redundant motion vectors can be readily extended to motion vectors for 3D cuboids, and to other syntax elements like reference picture indices, interpolation filter selection and/or coefficients, partition modes that are used to generate prediction in inter coding.

Figure 8:
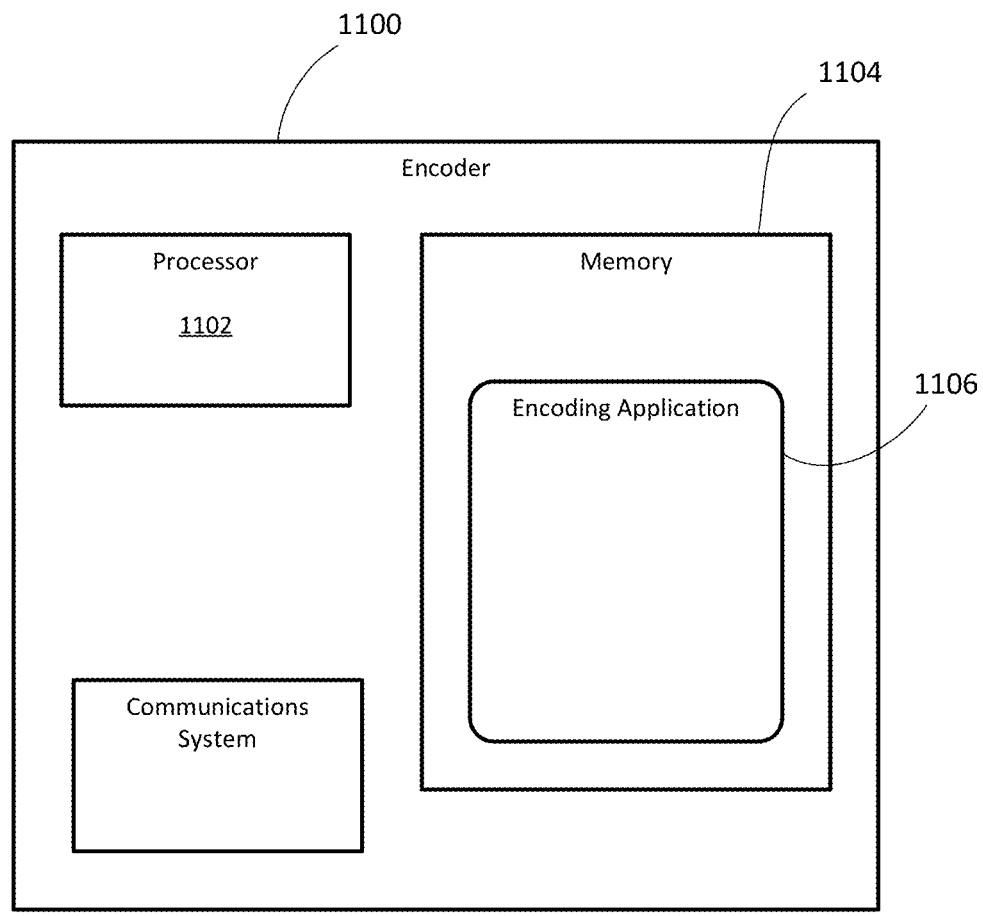
FIG. 8 shows an example simplified block diagram of an encoder.

Reference is now made to FIG. 8, which shows a simplified block diagram of an example embodiment of an encoder 1100. The encoder 1100 includes a processor 1102, memory 1104, and an encoding application 1106. The encoding application 1106 may include a computer program or application stored in memory 1104 and containing instructions that, when executed, cause the processor 1102 to perform operations such as those described herein. For example, the encoding application 1106 may encode and output bitstreams encoded in accordance with the processes described herein. It will be understood that the encoding application 1106 may be stored in on a non-transitory computer-readable medium, such as a compact disc, flash memory device, random access memory, hard drive, etc. When the instructions are executed, the processor 1102 carries out the operations and functions specified in the instructions so as to operate as a special-purpose processor that implements the described process(es). Such a processor may be referred to as a "processor circuit" or "processor circuitry" in some examples.

Figure 9:
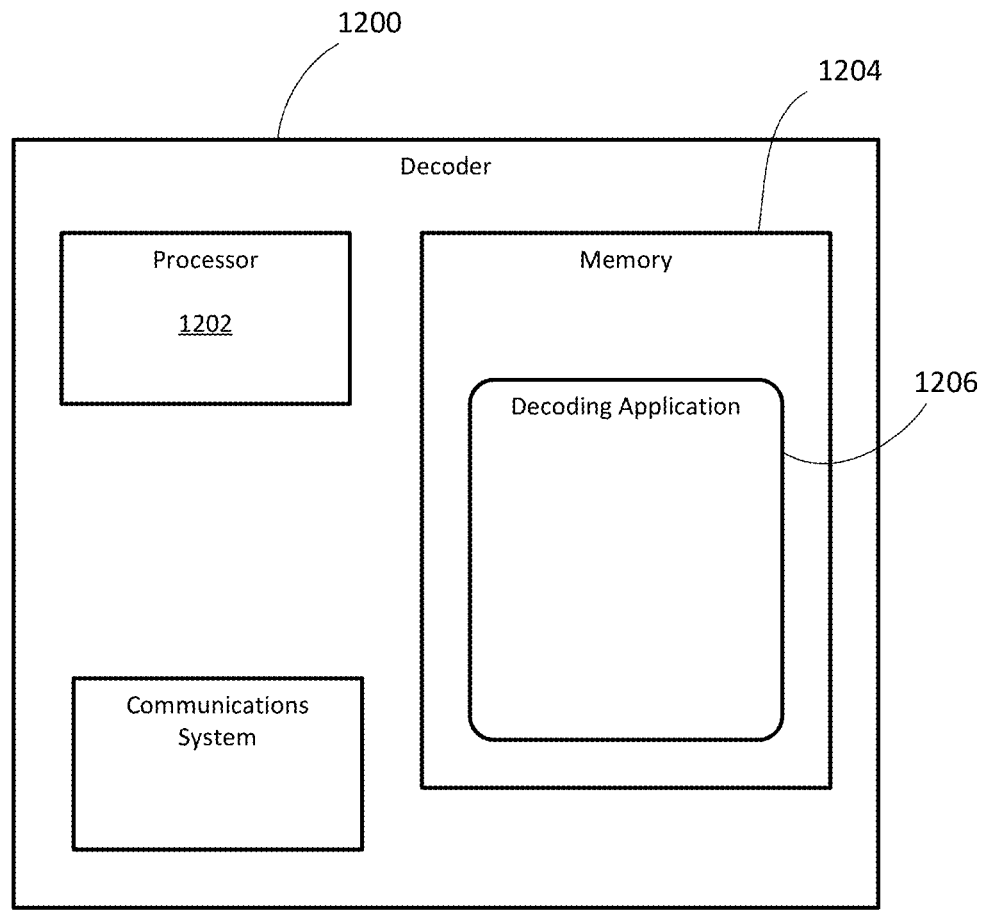
FIG. 9 shows an example simplified block diagram of a decoder.

Reference is now also made to FIG. 9, which shows a simplified block diagram of an example embodiment of a decoder 1200. The decoder 1200 includes a processor 1202, a memory 1204, and a decoding application 1206. The decoding application 1206 may include a computer program or application stored in memory 1204 and containing instructions that, when executed, cause the processor 1202 to perform operations such as those described herein. It will be understood that the decoding application 1206 may be stored in on a computer-readable medium, such as a compact disc, flash memory device, random access memory, hard drive, etc. When the instructions are executed, the processor 1202 carries out the operations and functions specified in the instructions so as to operate as a special-purpose processor that implements the described process(es). Such a processor may be referred to as a "processor circuit" or "processor circuitry" in some examples.

It will be appreciated that the decoder and/or encoder according to the present application may be implemented in a number of computing devices, including, without limitation, servers, suitably-programmed general purpose computers, audio/video encoding and playback devices, set-top television boxes, television broadcast equipment, and mobile devices. The decoder or encoder may be implemented by way of software containing instructions for configuring a processor or processors to carry out the functions described herein. The software instructions may be stored on any suitable non-transitory computer-readable memory, including CDs, RAM, ROM, Flash memory, etc.

It will be understood that the decoder and/or encoder described herein and the module, routine, process, thread, or other software component implementing the described method/process for configuring the encoder or decoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of encoding a video in a video encoder to produce a bitstream, the video including a sequence of pictures including a current picture and a previously-reconstructed reference picture, the current picture including a current block to be encoded using inter-prediction, the method comprising:
   determining, for the current block, a motion vector predictor that identifies a block in the previously-reconstructed reference picture;
   determining that at least some candidate motion vectors in a set of candidate motion vectors in a search range around the motion vector predictor identify respective candidate blocks in the previously-reconstructed reference picture that are redundant and, based on that determination, eliminating said at least some of the candidate motion vectors to reduce the set to a subset, and wherein said one of the candidate blocks is determined to be redundant based on applying a function to said one of the candidate blocks and to said another of the candidate blocks and determining that the result of said function is identical in both cases;
   selecting, from among the candidate motion vectors in the subset, a current motion vector to identify a predicted block for the current block; and
   entropy encoding the current motion vector selected from the subset.

2. The method claimed in claim 1, wherein applying a function comprises computing a distance between said one of the candidate blocks and said another of the candidate blocks by using a metric selected from $L_1$, $L_2$, $L_\infty$, mean absolute error, mean squared error, or structural similarity.

3. The method claimed in claim 1, wherein the function comprises one of a locality-sensitive hashing, a scalar quantization, a vector quantization, a principle component analysis, or an auto-encoder neural network.

4. The method claimed in claim 1, wherein determining that at least some candidate motion vectors in a set of candidate motion vectors around the motion vector predictor identify respective candidate blocks in the previously-reconstructed reference picture that are redundant and, based on that determination, eliminating said at least some of the candidate motion vectors comprises:
   for each candidate motion vector in the set, in turn,
      determining a candidate block identified by that candidate motion vector, and
      adding that candidate motion vector to the subset when the candidate block identified by that candidate motion vector is determined not to be redundant with any other candidate block identified by candidate motion vectors that are part of the subset.

5. The method claimed in claim 1, wherein the candidate motion vectors in the set include a first layer of candidate motion vectors and a second layer of candidate motion vectors, and wherein determining that at least some candidate motion vectors in a set of candidate motion vectors around the motion vector predictor identify respective candidate blocks in the previously-reconstructed reference picture that are redundant comprises:

initializing the subset to contain the first layer of candidate motion vectors without determining that they are redundant, and determining that at least some of the second layer of candidate motion vectors identify respective candidate blocks that are redundant with respect to candidate blocks identified by respective ones of the first layer of candidate motion vectors.

6. The method claimed in claim 1, wherein the candidate motion vectors include integer-pel motion vectors each pointing to full pixel location and sub-pel motion vectors each pointing to a sub-pixel position between full pixels, and wherein determining that at least some candidate motion vectors in a set of candidate motion vectors around the motion vector predictor identify respective candidate blocks in the previously-reconstructed reference picture that are redundant comprises determining that more than a maximum number of the sub-pel motion vectors identify respective candidate blocks that are redundant, and wherein eliminating at least some of the candidate motion vectors comprises eliminating all the sub-pel motion vectors.

7. An encoder for encoding a video to produce a bitstream, the video including a sequence of pictures including a current picture and a previously-reconstructed reference picture, the current picture including a current block to be encoded using inter-prediction, the encoder comprising:
a processor;
memory; and
an encoding application containing instructions executable by the processor that, when executed, cause the processor to
determine, for the current block, a motion vector predictor that identifies a block in the previously-reconstructed reference picture;
determine that at least some candidate motion vectors in a set of candidate motion vectors in a search range around the motion vector predictor identify respective candidate blocks in the previously-reconstructed reference picture that are redundant and, based on that determination, eliminate said at least some of the candidate motion vectors to reduce the set to a subset, and wherein said one of the candidate blocks is determined to be redundant based on applying a function to said one of the candidate blocks and to said another of the candidate blocks and determining that the result of said function is identical in both cases;
select, from among the candidate motion vectors in the subset, a current motion vector to identify a predicted block for the current block; and
entropy encode the current motion vector selected from the subset.

8. The encoder claimed in claim 7, wherein said instructions cause the processor to apply a function by determining a distance between said one of the candidate blocks and said another of the candidate blocks using a metric selected from $L_1$, $L_2$, $L_\infty$, mean absolute error, mean squared error, or structural similarity.

9. The encoder claimed in claim 7, wherein the function comprises one of a locality-sensitive hashing, a scalar quantization, a vector quantization, a principle component analysis, or an auto-encoder neural network.

10. The encoder claimed in claim 7, wherein the instructions, when executed, cause the processor to determine that at least some candidate motion vectors in a set of candidate motion vectors around the motion vector predictor identify respective candidate blocks in the previously-reconstructed reference picture that are redundant and, based on that determination, eliminate said at least some of the candidate motion vectors by:
for each candidate motion vector in the set, in turn,
determining a candidate block identified by that candidate motion vector, and
adding that candidate motion vector to the subset when the candidate block identified by that candidate motion vector is determined not to be redundant with any other candidate block identified by candidate motion vectors that are part of the subset.

11. The encoder claimed in claim 7, wherein the candidate motion vectors in the set include a first layer of candidate motion vectors and a second layer of candidate motion vectors, and wherein the instructions, when executed, cause the processor to determine that at least some candidate motion vectors in a set of candidate motion vectors around the motion vector predictor identify respective candidate blocks in the previously-reconstructed reference picture that are redundant by:
initializing the subset to contain the first layer of candidate motion vectors without determining that they are redundant, and
determining that at least some of the second layer of candidate motion vectors identify respective candidate blocks that are redundant with respect to candidate blocks identified by respective ones of the first layer of candidate motion vectors.

12. The encoder claimed in claim 7, wherein the candidate motion vectors include integer-pel motion vectors each pointing to full pixel location and sub-pel motion vectors each pointing to a sub-pixel position between full pixels, and wherein the instructions, when executed, cause the processor to determine that at least some candidate motion vectors in a set of candidate motion vectors around the motion vector predictor identify respective candidate blocks in the previously-reconstructed reference picture that are redundant by determining that more than a maximum number of the sub-pel motion vectors identify respective candidate blocks that are redundant, and wherein the instructions, when executed, cause the processor to eliminate at least some of the candidate motion vectors by eliminating all the sub-pel motion vectors.

13. A non-transitory processor-readable medium storing processor-executable instructions for encoding a video to generate a bitstream of encoded data, the video including a sequence of pictures including a current picture and a previously-reconstructed reference picture, the current picture including a current block to be encoded using inter-prediction, wherein the processor-executable instructions, when executed by a processor in a video encoder, cause the processor to:
determine, for the current block, a motion vector predictor that identifies a block in the previously-reconstructed reference picture;
determine that at least some candidate motion vectors in a set of candidate motion vectors in a search range around the motion vector predictor identify respective candidate blocks in the previously-reconstructed reference picture that are redundant and, based on that determination, eliminate said at least some of the candidate motion vectors to reduce the set to a subset, and wherein said one of the candidate blocks is determined to be redundant based on applying a function to said one of the candidate blocks and to said another of the candidate blocks and determining that the result of said function is identical in both cases;

select, from among the candidate motion vectors in the subset, a current motion vector to identify a predicted block for the current block; and entropy encode the current motion vector selected from the subset.

14. A method of decoding a video from a bitstream, the video including a sequence of pictures including a current picture and a previously-reconstructed reference picture, the current picture including a current block to be decoded using inter-prediction, the method comprising:

determining, for the current block, a motion vector predictor that identifies a block in the previously-reconstructed reference picture;

determining that at least some candidate motion vectors in a set of candidate motion vectors in a search range around the motion vector predictor identify respective candidate blocks in the previously-reconstructed reference picture that are redundant and, based on that determination, eliminating said at least some of the candidate motion vectors to reduce the set to a subset, and wherein said one of the candidate blocks is determined to be redundant based on applying a function to said one of the candidate blocks and to said another of the candidate blocks and determining that the result of said function is identical in both cases;

entropy decoding a current motion vector from the bitstream on the basis that it is one of the candidate motion vectors from the subset, wherein the current motion vector identifies a predicted block for the current block; and reconstructing the current block based on the predicted block and a reconstructed residual for the current block.

15. The method claimed in claim 14, wherein applying a function comprises computing a distance between said one of the candidate blocks and said another of the candidate blocks by using a metric selected from $L_1$, $L_2$, $L_\infty$, mean absolute error, mean squared error, or structural similarity.

16. The method claimed in claim 14, wherein the function comprises one of a locality-sensitive hashing, a scalar quantization, a vector quantization, a principle component analysis, or an auto-encoder neural network.

17. The method claimed in claim 14, wherein determining that at least some candidate motion vectors in a set of candidate motion vectors around the motion vector predictor identify respective candidate blocks in the previously-reconstructed reference picture that are redundant and, based on that determination, eliminating said at least some of the candidate motion vectors comprises:

for each candidate motion vector in the set, in turn,
determining a candidate block identified by that candidate motion vector, and
adding that candidate motion vector to the subset when the candidate block identified by that candidate motion vector is determined not to be redundant with any other candidate block identified by candidate motion vectors that are part of the subset.

18. The method claimed in claim 14, wherein the candidate motion vectors in the set include a first layer of candidate motion vectors and a second layer of candidate motion vectors, and wherein determining that at least some candidate motion vectors in a set of candidate motion vectors around the motion vector predictor identify respective candidate blocks in the previously-reconstructed reference picture that are redundant comprises:

initializing the subset to contain the first layer of candidate motion vectors without determining that they are redundant, and determining that at least some of the second layer of candidate motion vectors identify respective candidate blocks that are redundant with respect to candidate blocks identified by respective ones of the first layer of candidate motion vectors.

19. The method claimed in claim 14, wherein the candidate motion vectors include integer-pel motion vectors each pointing to full pixel location and sub-pel motion vectors each pointing to a sub-pixel position between full pixels, and wherein determining that at least some candidate motion vectors in a set of candidate motion vectors around the motion vector predictor identify respective candidate blocks in the previously-reconstructed reference picture that are redundant comprises determining that more than a maximum number of the sub-pel motion vectors identify respective candidate blocks that are redundant, and wherein eliminating at least some of the candidate motion vectors comprises eliminating all the sub-pel motion vectors.

20. A decoder for decoding a video from a bitstream, the video including a sequence of pictures including a current picture and a previously-reconstructed reference picture, the current picture including a current block to be decoded using inter-prediction, the decoder comprising:

a processor;
memory; and
a decoding application containing instructions executable by the processor that, when executed, cause the processor to
determine, for the current block, a motion vector predictor that identifies a block in the previously-reconstructed reference picture;
determine that at least some candidate motion vectors in a set of candidate motion vectors in a search range around the motion vector predictor identify respective candidate blocks in the previously-reconstructed reference picture that are redundant and, based on that determination, eliminate said at least some of the candidate motion vectors to reduce the set to a subset, and wherein said one of the candidate blocks is determined to be redundant based on applying a function to said one of the candidate blocks and to said another of the candidate blocks and determining that the result of said function is identical in both cases;
entropy decode a current motion vector from the bitstream on the basis that it is one of the candidate motion vectors from the subset, wherein the current motion vector identifies a predicted block for the current block; and
reconstruct the current block based on the predicted block and a reconstructed residual for the current block.

21. The decoder claimed in claim 20, wherein said instructions cause the processor to apply a function by determining a distance between said one of the candidate blocks and said another of the candidate blocks using a metric selected from $L_1$, $L_2$, $L_\infty$, mean absolute error, mean squared error, or structural similarity.

22. The decoder claimed in claim 20, wherein the function comprises one of a locality-sensitive hashing, a scalar quantization, a vector quantization, a principle component analysis, or an auto-encoder neural network.

23. The decoder claimed in claim 20, wherein the instructions, when executed, cause the processor to determine that at least some candidate motion vectors in a set of candidate motion vectors around the motion vector predictor identify respective candidate blocks in the previously-reconstructed reference picture that are redundant and, based on that determination, eliminate said at least some of the candidate motion vectors by:

for each candidate motion vector in the set, in turn,
determining a candidate block identified by that candidate motion vector, and
adding that candidate motion vector to the subset when the candidate block identified by that candidate motion vector is determined not to be redundant with any other candidate block identified by candidate motion vectors that are part of the subset.

24. The encoder claimed in claim 20, wherein the candidate motion vectors in the set include a first layer of candidate motion vectors and a second layer of candidate motion vectors, and wherein the instructions, when executed, cause the processor to determine that at least some candidate motion vectors in a set of candidate motion vectors around the motion vector predictor identify respective candidate blocks in the previously-reconstructed reference picture that are redundant by:

initializing the subset to contain the first layer of candidate motion vectors without determining that they are redundant, and
determining that at least some of the second layer of candidate motion vectors identify respective candidate blocks that are redundant with respect to candidate blocks identified by respective ones of the first layer of candidate motion vectors.

25. The decoder claimed in claim 20, wherein the candidate motion vectors include integer-pel motion vectors each pointing to full pixel location and sub-pel motion vectors each pointing to a sub-pixel position between full pixels, and wherein the instructions, when executed, cause the processor to determine that at least some candidate motion vectors in a set of candidate motion vectors around the motion vector predictor identify respective candidate blocks in the previously-reconstructed reference picture that are redundant by determining that more than a maximum number of the sub-pel motion vectors identify respective candidate blocks that are redundant, and wherein the instructions, when executed, cause the processor to eliminate at least some of the candidate motion vectors by eliminating all the sub-pel motion vectors.

26. A non-transitory processor-readable medium storing processor-executable instructions for decoding a video from a bitstream of encoded data, the video including a sequence of pictures including a current picture and a previously-reconstructed reference picture, the current picture including a current block to be decoded using inter-prediction, wherein the processor-executable instructions, when executed by a processor in a video decoder, cause the processor to:

determine, for the current block, a motion vector predictor that identifies a block in the previously-reconstructed reference picture;
determine that at least some candidate motion vectors in a set of candidate motion vectors in a search range around the motion vector predictor identify respective candidate blocks in the previously-reconstructed reference picture that are redundant and, based on that determination, eliminate said at least some of the candidate motion vectors to reduce the set to a subset, and wherein said one of the candidate blocks is determined to be redundant based on applying a function to said one of the candidate blocks and to said another of the candidate blocks and determining that the result of said function is identical in both cases;
entropy decode a current motion vector from the bitstream on the basis that it is one of the candidate motion vectors from the subset, wherein the current motion vector identifies a predicted block for the current block; and
reconstruct the current block based on the predicted block and a reconstructed residual for the current block.

* * * * *